United States Patent
Kays et al.

[11] Patent Number: 5,411,158
[45] Date of Patent: May 2, 1995

[54] RUPTURE DISK CONSTRUCTION

[75] Inventors: Jerry W. Kays, Tulsa; John W. Reynolds, Bixby; Alan T. Wilson, Broken Arrow, all of Okla.

[73] Assignee: Oklahoma Safety Equipment Co., Broken Arrow, Okla.

[21] Appl. No.: 984,918

[22] Filed: Dec. 2, 1992

[51] Int. Cl.⁶ .................................. B65D 25/00
[52] U.S. Cl. ........................ 220/89.2; 137/68.1
[58] Field of Search .............. 220/89.2, 207, 203, 220/266, 268, 276; 215/250, 253, 260; 413/15, 17; 137/68.1

[56] References Cited

U.S. PATENT DOCUMENTS

| | | | |
|---|---|---|---|
| 2,553,267 | 5/1951 | Nedoh | 220/89.2 |
| 2,716,506 | 8/1955 | Fike | 220/89.2 |
| 2,980,286 | 4/1961 | Coffman . | |
| 3,121,509 | 2/1964 | Porter . | |
| 3,257,026 | 6/1966 | Taylor . | |
| 3,292,826 | 12/1966 | Abyblanalp | 220/89.2 X |
| 3,484,817 | 12/1969 | Wood . | |
| 3,520,443 | 7/1970 | Selby, Jr. . | |
| 3,704,807 | 12/1972 | Lidgard . | |
| 3,722,734 | 3/1973 | Raidl, Jr. | 220/89.2 |
| 3,845,879 | 11/1974 | Dernbach et al. . | |
| 4,404,982 | 9/1983 | Ou | 220/89.2 X |
| 4,416,388 | 11/1983 | Mulawski | 220/207 |
| 4,803,136 | 2/1989 | Bowsky et al. | 220/207 X |
| 5,167,337 | 12/1992 | Short, III et al. | 220/89.2 |

Primary Examiner—Allan N. Shoap
Assistant Examiner—Stephen Cronin
Attorney, Agent, or Firm—Pravel, Hewitt, Kimball & Krieger

[57] ABSTRACT

A rupture disk provides an improved scoring configuration that allows low pressure burst disks of very small diameter such as, for example, 0.25 inches in diameter, wherein the score of the rupture disk is generally circular in shape which terminates at end portions that define a hinge therebetween.

7 Claims, 1 Drawing Sheet

RUPTURE DISK CONSTRUCTION

BACKGROUND OF THE INVENTION

1. Field of the Invention

The present invention relates to rupture disks, and more particularly to an improved rupture disk having a generally circular score pattern which cuts at least halfway through the disk material using a beveled cut.

2. General Background

Rupture disks are used for the relief of pressure from process vessels and the like. Such vessels are typically expensive so that a failure of the vessel can create significant property damage, the threat of personal injury or death, as well as environmental hazard. Rupture disks are commercially available in a variety of sizes, shapes, and with various pressure values.

Several patents have issued on rupture disks.

U.S. Pat. No. 3,484,817 discloses a safety pressure relief valve in the form of a reverse buckling disc having a cross hair pattern.

U.S. Pat. No. 3,520,443 issued to R. M. Selby discloses a safety vent structure that includes a cross hair pattern that divides the disc into six pie-wedge shaped segments.

In U.S. Pat. No. 3,704,807 issued to Robert Lidgard there is provided a pre-bulged, frangible member and a relief device employing the frangible member that has a predetermined burst pattern that is relieved into its crown which insures that no portion of the member is severed from the member when it fails. The basic pattern uses radial slits extending from the periphery of the crown and terminating short of the center. The center portion of the crown is relieved with a pattern employing at least one non-rupturable interconnecting web between the apex and the remainder of the member so that upon failure this web remains the apex of the crown.

The Dernbach, et al U.S. Pat. No. 3,845,879 dicloses a safety fitting for a pipe or vessel and contained within a flange coupling. The device includes a rupture disc with radial grooves placed on one side which will normally be at a higher pressure and is backed by a perforated support member placed on the other side such that under normal conditions the support member supports the rupture disc in the areas of the grooves. If the pressure on the other side exceeds that on the one side of the disc is no longer supported and will rupture allowing flow through the fitting.

A quick opening rupture disc is seen in the Taylor U.S. Pat. No. 3,257,026. The device includes a circular disc having a cross hair pattern.

The Coffman U.S. Pat. No. 2,980,286 entitled "Safety Pressure Relief Device Support" discloses a rupture disc of generally concave convex shape having an annular generally circular skirt at its periphery with a central concave convex disc portion.

The Porter U.S. Pat. No. 3,121,509 entitled "Damage Resistant Rupture Disc Assembly" provides a concave convex disc-shaped member having an arcuate slot that tracks a generally circular path but terminates at two end portions to provide a hinge there between.

In the Raidl U.S. Pat. No. 3,722,734 entitled "Safety Relief Device" there is provided a burst pattern that is cut or relieved in the dome of the disc to fail at a pressure less than the snapover pressure so that pressure causing snapover results in failure and bursting of the disc. The apparatus includes a frangible disc and support assembly that includes a ceiling diaphragm member and a support member. The support member has a circular slit which extends a substantial distance around the base portion of the dome. A second support member is provided on the downstream side of the support member to overlay the relieved portion and thus prevent it from premature failure.

A Shear diagram relief union is the subject of U.S. Pat. No. 2,553,267. The 267 patent is provides a circular relief device having a diaphragm or web connected to a ring and has a generally circular groove adjacent to its connection with the ring except for a short portion which serves as a hinge when the diaphragm shears.

The Fike U.S. Pat. No. 2,716,506 entitled "Rupture Disc Assembly for High Pressure Vessels" provides a diaphragm providing an arcuate slot in the diaphragm and preferring that the slot be substantially larger than a semicircle so that the member will swing away in hinge-like manner substantially clear of the relief opening.

Presently, under current manufacturing methods, the lowest burst pressure obtainable for a scored, tension-loaded rupture disk is about 70 psig at about 72° Fahrenheit in a one-inch size. This type of disk is manufactured by using a mechanical score blade to cut more than halfway through the disk material in a "cross hair" score configuration. However, the "cross hair" score configuration is not practical in small sizes such as, for example, less than one inch.

SUMMARY OF THE INVENTION

The present invention provides an improved rupture disk construction that provides a disk having a circular score configuration. This circular score configuration overcomes restrictions by allowing score diameters as small as one quarter (0.25) inches. Thus, an improved rupture disk is provided to lower burst pressures in very small rupture disks.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

Figure 1:
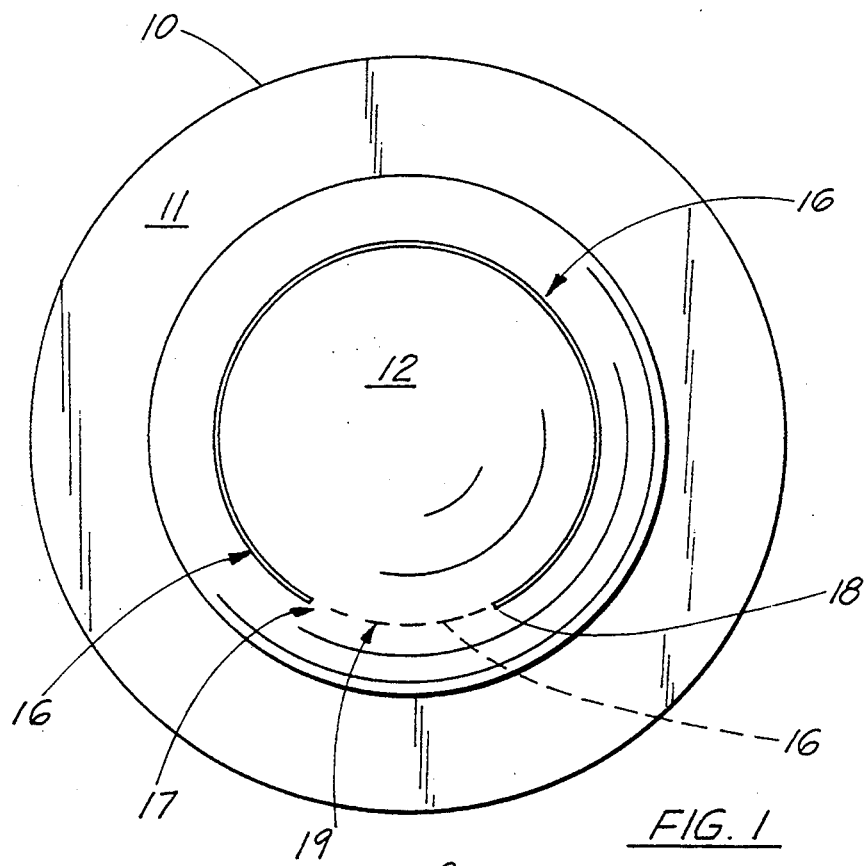
FIG. 1 is a top view of the preferred embodiment of the apparatus of the present invention.
Figure 2:
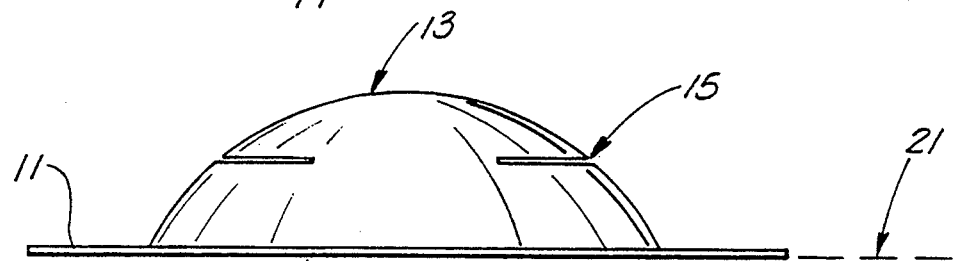
FIG. 2 is a side view of the preferred embodiment of the apparatus of the present invention.
Figure 3:
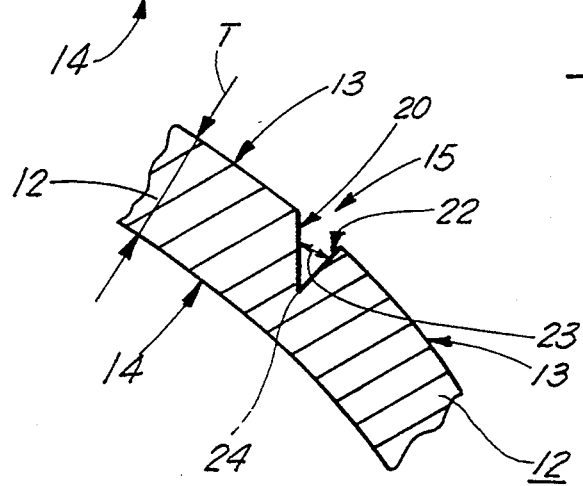
FIG. 3 is a partial sectional view of the preferred embodiment of the apparatus of the present invention.

DETAILED DESCRIPTION OF THE PREFERRED EMBODIMENT:

FIGS. 1-3 illustrate the preferred embodiment of the apparatus of the present invention designated generally by the numeral 10. In FIG. 1, there can be seen a rupture disk 10 that is generally circular in shape having a flat annular skirt portion 11 and a concave/convex disk 12 that includes an outer convex surface 13 and an innermost concave surface 14. The convex side 13 of disk 12 is scored with an arcuate score 15 that tracks a circular path 16. The score 15 terminates at end portion 17, 18.

The end portions 17, 18 define therebetween an uncut, unscored area 19 that defines a hinge after the disk ruptures.

The score 15 is generally bevelled or "V" shaped in section as shown in FIG. 3, providing a generally vertically extending annular shoulder 20 that is generally perpendicular to the plane 21 defined by flange 11. A second annular shoulder 22 forms an angle of about 45° with the plane 21 of flange 11. Thus, the V-shaped score 15 is approximately 45° in section as defined by the angle 23 in FIG. 3. Score 15 terminates at inner edge 24 which preferably extends at least halfway into disk 12 as measured from the convex surface 13 toward the concave surface 14 and indicated as thickness T in FIG. 3.

The angle 23 is preferably an acute angle of between twenty degrees (20°) and seventy degrees (70°). Thus, the second annular shoulder defines a surface that forms an acute angle of at least twenty degrees (20°) with the plane of the annular skirt 11. The annular surface 20 forms an angle of preferably ninety degrees (90°) with the plane of annular skirt 11.

The following Table 1 lists the part numbers and part descriptions as used herein in the written specification and the numbers as used in the attached drawing figures.

PARTS LIST

| Part Number | Description |
| --- | --- |
| 10 | rupture disk |
| 11 | annular skirt portion |
| 12 | concave/convex disk |
| 13 | convex surface |
| 14 | concave surface |
| 15 | score |
| 16 | circular path |
| 17 | end portion |
| 18 | end portion |
| 19 | unscored area |
| 20 | annular surface |
| 21 | plane |
| 22 | annular shoulder |
| 23 | angle |
| 24 | edge |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A rupture disk comprising:
    a) an annular skirt member that is substantially flat, so as to define a horizontal plane;
    b) a concave/convex disk portion integrally formed and extending from the plane of the skirt and having a periphery that is surrounded by the skirt member;
    c) the disk portion having concave and convex respective surface portions;
    d) a score formed on the convex side of the disk portion and extending circumferentially about the disk portion to define a generally circular score pattern, wherein the score has end portions that terminate with an unscored portion of the disk portion therebetween to define a hinge;
    e) the score being substantially "V" shaped in transverse section, and comprising a substantially vertically extending first annular surface, perpendicular to said horizontal plane and a second annular surface that forms an acute angle with the plane of the skirt of between about twenty degrees and seventy degrees (20° and 70°); and
    f) the score having an inner edge defined by an intersection of the first and second annular surfaces, the inner edge being positioned generally between the concave and convex surfaces.

2. The rupture disk of claim 1 wherein the acute angle is at least forty-five degrees (45°).

3. The rupture disk of claim 1 wherein the skirt is generally circular in shape.

4. The rupture disk of claim 1 wherein the second annular surface forms an acute angle of about forty-five degrees (45°) with the plane of the skirt.

5. The rupture disk of claim 1 wherein the score extends at least halfway between the concave and convex surfaces.

6. The rupture disk of claim 1 wherein the score extends about halfway between the concave and convex surfaces.

7. The rupture disk of claim 1 wherein the score is positioned approximately midway between the portion of the disk portion that connects with the skirt and an apex of the concave/convex disk portion.

* * * * *